US006883463B2

(12) United States Patent
Link

(10) Patent No.: US 6,883,463 B2
(45) Date of Patent: Apr. 26, 2005

(54) ANIMAL ENCLOSURE

(75) Inventor: David B. Link, Irvine, CA (US)

(73) Assignee: Precision Pet Products, Costa Mesa, CA (US)

( * ) Notice: Subject to any disclaimer, the term of this patent is extended or adjusted under 35 U.S.C. 154(b) by 0 days.

(21) Appl. No.: 10/642,404

(22) Filed: Aug. 15, 2003

(65) Prior Publication Data

US 2005/0034679 A1 Feb. 17, 2005

(51) Int. Cl.$^7$ .............................................. A01K 1/03
(52) U.S. Cl. ..................................... 119/474; 119/453
(58) Field of Search ....................... 119/452, 453, 459, 119/461, 462, 463, 472, 473, 474, 479

(56) References Cited

U.S. PATENT DOCUMENTS

| | | | |
|---|---|---|---|
| 3,896,766 A | * | 7/1975 | Martin ........................ 119/474 |
| 4,016,833 A | | 4/1977 | Ray |
| 4,140,080 A | * | 2/1979 | Snader ........................ 119/473 |
| 4,527,512 A | | 7/1985 | Sugiura |
| 4,590,885 A | | 5/1986 | Sugiura |
| 4,762,085 A | | 8/1988 | Ondrasik |
| 4,763,606 A | | 8/1988 | Ondrasik |
| 4,917,047 A | | 4/1990 | Wazeter, III |
| 5,097,796 A | | 3/1992 | Reimers |
| 5,233,939 A | | 8/1993 | Randolph |
| 5,335,618 A | | 8/1994 | Zarola |
| 5,482,005 A | | 1/1996 | Thom |
| 5,544,619 A | | 8/1996 | Braun |
| 5,549,073 A | | 8/1996 | Askins |
| 5,626,098 A | | 5/1997 | Askins |
| 5,653,194 A | | 8/1997 | Guy |
| 5,752,470 A | | 5/1998 | Koneke |
| 5,950,568 A | | 9/1999 | Axelrod |
| 5,967,089 A | | 10/1999 | Allen |
| 6,092,488 A | | 7/2000 | Allawas |
| 6,152,081 A | | 11/2000 | Baker |
| 6,155,206 A | * | 12/2000 | Godshaw ..................... 119/453 |
| 6,192,834 B1 | | 2/2001 | Kolozsvari |
| 6,631,590 B1 | | 10/2003 | Glowaski |
| 6,681,720 B1 | * | 1/2004 | Skurdalsvold et al. ...... 119/474 |

* cited by examiner

Primary Examiner—Son T. Nguyen
(74) Attorney, Agent, or Firm—Stetina Brunda Garred & Brucker

(57) ABSTRACT

An animal enclosure, having a top wall panel, a bottom rack disposed opposite to the top wall panel, two opposite first side wall panels, a third side wall panel and a fourth side wall panel. Each of the first side wall panels has a top edge hinged to the top wall panels and a bottom edge hinged with the bottom rack at a first elevation. The second side wall panel disposed between and adjacent to the first side wall panels has a bottom edge hinged to the bottom rack at a second elevation. The third side wall panel is opposite to the second side wall panel and adjacent to the first side wall panels. The third side wall has a bottom edge hinged to the bottom rack at a third elevation. The first, second and third elevations are at different from each other such that the top wall panel, the first, second and fourth side wall panels can be folded stacked with each other on the bottom rack. The animal enclosure includes at least one removable door formed on one of the side wall panels allowing the user to use the enclosure as a training space.

15 Claims, 6 Drawing Sheets

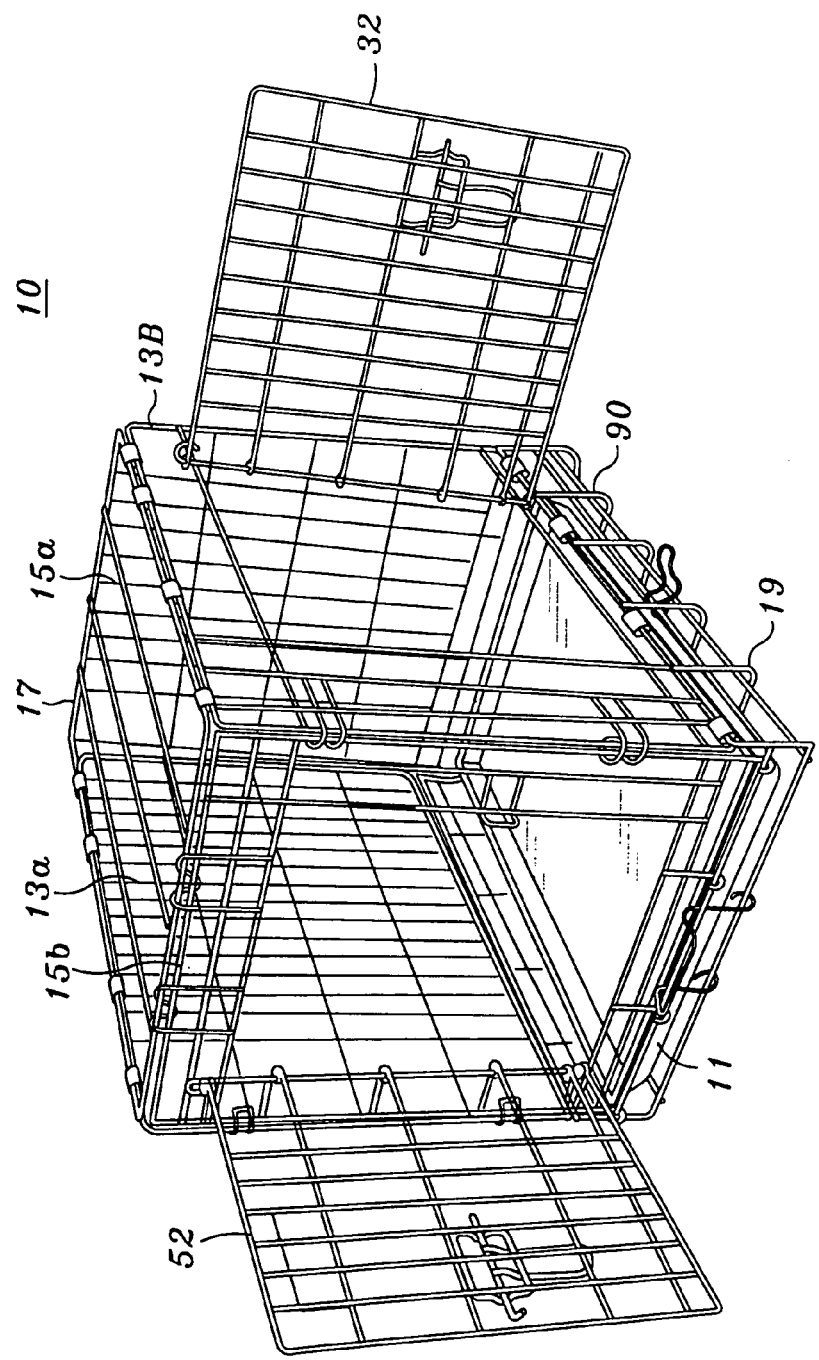

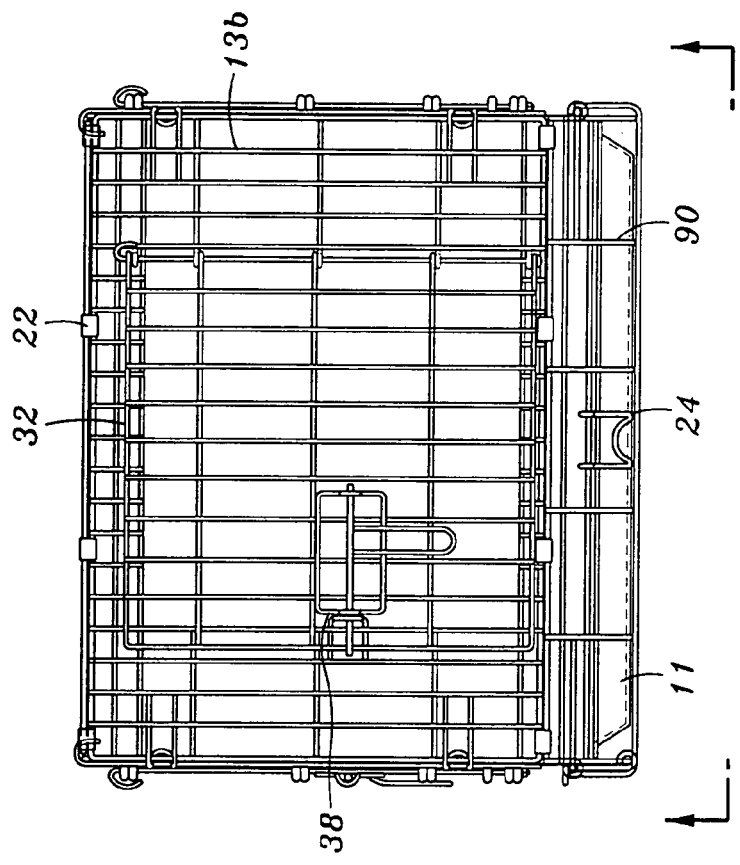
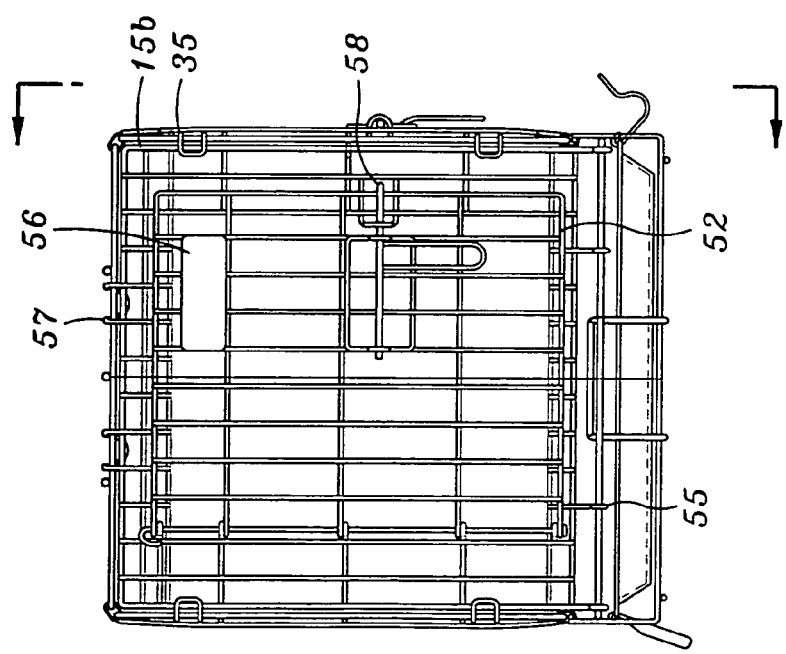

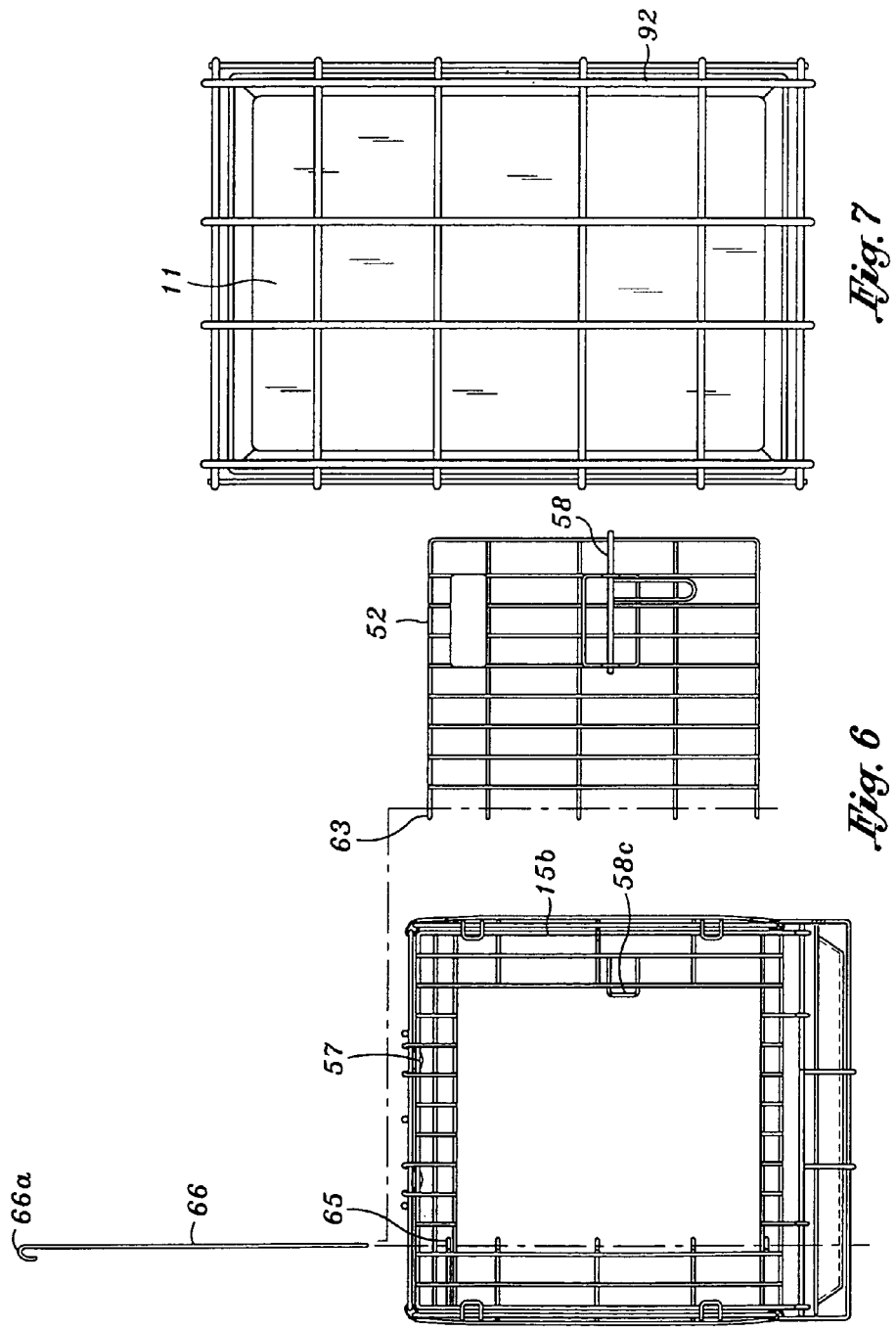

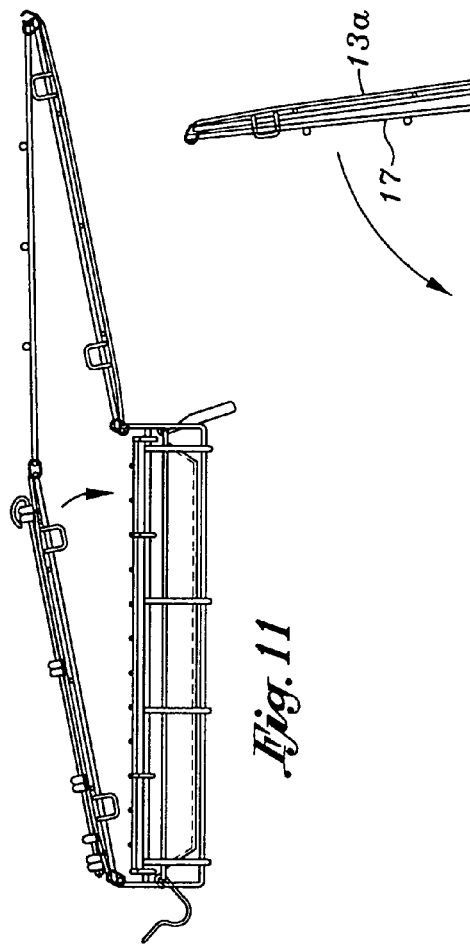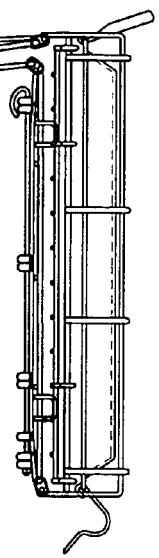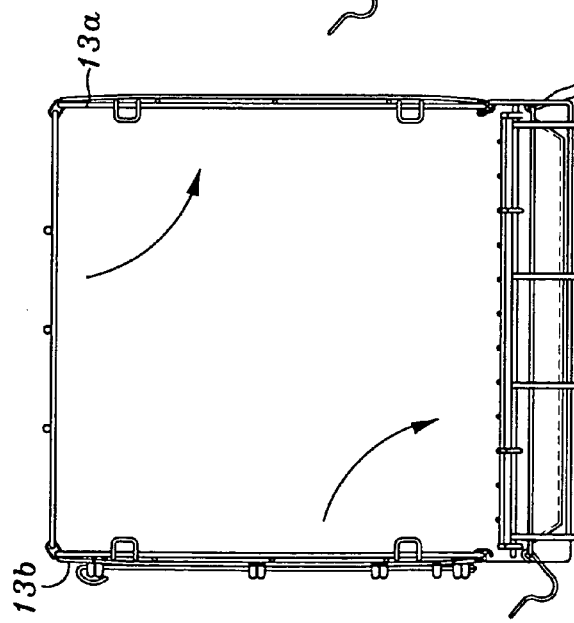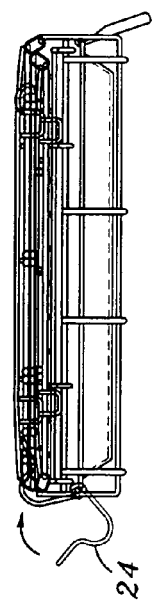

ANIMAL ENCLOSURE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates generate to a portable animal enclosure, and more particularly, to a collapsible animal enclosure.

Various types of pet or animal enclosures have been commonly used to accommodate, confine and transport pets or animals. Most of the animal enclosures are formed having a rigid box shape and tend to be bulky, heavy and difficult to move from one location to another. More particularly, most animal enclosures cannot be stored in the trunk of a typically family vehicle. Therefore, a large vehicle such as a truck or utility vehicle is required for animal transport, or the animal has to be left behind.

More recently, some collapsible animal enclosures have been introduced in the market place. One problem of such collapsible enclosures has been the inability to provide adequate air circulation. Furthermore, most of the prior art enclosures require tools such as screw driver and hammers to assemble or dissemble the enclosures.

Another common problem of such prior art enclosures is that most of the animal enclosures have only one access door allowing only a single-direction entrance or exit of the animal from the enclosure. Therefore, such enclosure can only be disposed at a certain position and orientation to avoid blocking the access thereof.

Therefore, a substantial need exists to develop a portable animal enclosure that can be easily assembled without tool to provide a comfortable living area of the animal and dissembled into a size and configuration allowing the user to easily transport and store the same.

BRIEF SUMMARY OF THE INVENTION

The present invention provides a portable animal enclosure having a top wall panel, a bottom rack and four side wall panels. The bottom rack is disposed to rest on the ground on support surface opposite to the top wall panel. Two opposite first side wall panels each have a top edge hinged to the top wall panel and a bottom edge hinged to the bottom rack at a first elevation. A second side wall panel disposed between and adjacent to the first side wall panels has a bottom edge hinged to the bottom rack at a second elevation. A third side wall panel opposite to the second side wall panel and adjacent to the first side wall panels has a bottom edge hinged to the bottom rack at a third elevation. The bottom edges of the first, second and third are hinged at different elevations or heights to allow the top wall panel, the first, second and third side wall panel to be folded and stacked with each other upon the bottom rack. Further, at least one of the side wall panels includes a removable or detachable door formed thereon, allowing the user to apply the animal enclosure as a training space.

In one embodiment, the first hinge elevation is higher than the second hinge elevation, and the second hinge elevation is higher than the third hinge elevation. Preferably, the first side wall panels are hinged with the top wall panel and the bottom rack by a plurality of binder rings. The second and the third side wall panels each preferably include at least one hook extend under the bottom edge thereof to hinge the second and third side wall panel with the bottom rack, and at least one lug extending over the top edge thereof to latch a top edge thereof with the top wall panel. The enclosure further includes a latch formed at the bottom rack for latching the top wall panel, the first, second and third side wall panels while being folded on the bottom rack, and a handle allowing the user to carry the collapsed enclosure.

The top wall panel, side wall panels and bottom rack are preferably formed having a welded wire construction to provide adequate ventilation. However, it is contemplated that the same can be fabricated from a composite and/or polymer material. The bottom rack comprises a bottom panel and for vertical side portions extending upwardly therefrom. The vertical side portions define a space or region sized to receive a tray which may be slided through and disposed upon the bottom rack. One of the first side wall panels further includes a door having a latch. Similar to the top wall panel, the side wall panels and the bottom rack, the door is preferably formed having a welded wire construction. However, it is contemplated that the same can be fabricated from other materials. Each of the first side wall panels includes at least one curved wire extending from each vertical side edge thereof to prevent the adjacent second and third side wall panels to swing outwardly.

The present invention further provides a collapsible animal enclosure including a top wall panel, a bottom rack having a bottom panel and four vertical side portions, and four side wall panels. The first pair of opposite side wall panels may be folded towards the bottom panel while being unlatched to the top wall panel. A second pair of opposite side wall panels hinged between the top wall panel and the bottom rack is then folded flat on the first pair of side wall panels. The enclosure further comprises a replaceable tray slidable through one vertical side portion of the bottom rack.

In one embodiment, one of the vertical sides includes a latch to lock the top wall panel, side wall panels folded flat on the bottom rack and the bottom rack into one flat portable piece. A handle is formed at one vertical side portion of the bottom rack. The vertical side portion through which the tray is slidable comprises a latch to secure the tray in the enclosure. The enclosure is substantially rectangular parallelepiped.

BRIEF DESCRIPTION OF THE DRAWINGS

These, as well as other features of the present invention, will become more apparent upon reference to the drawing wherein:

FIG. 1 shows a perspective view of the animal enclosure in one embodiment of the present invention;

FIG. 4 shows a third side of the enclosure as illustrated in FIG. 1;

FIG. 5 shows a fourth side of the enclosure as illustrated in FIG. 1;

FIG. 6 shows an exploded view of the third side of the enclosure;

FIG. 7 shows a bottom view of the enclosure; and

FIGS. 8–13 show the process for folding the enclosure into one flat piece.

DETAILED DESCRIPTION OF THE INVENTION

Figure 3:
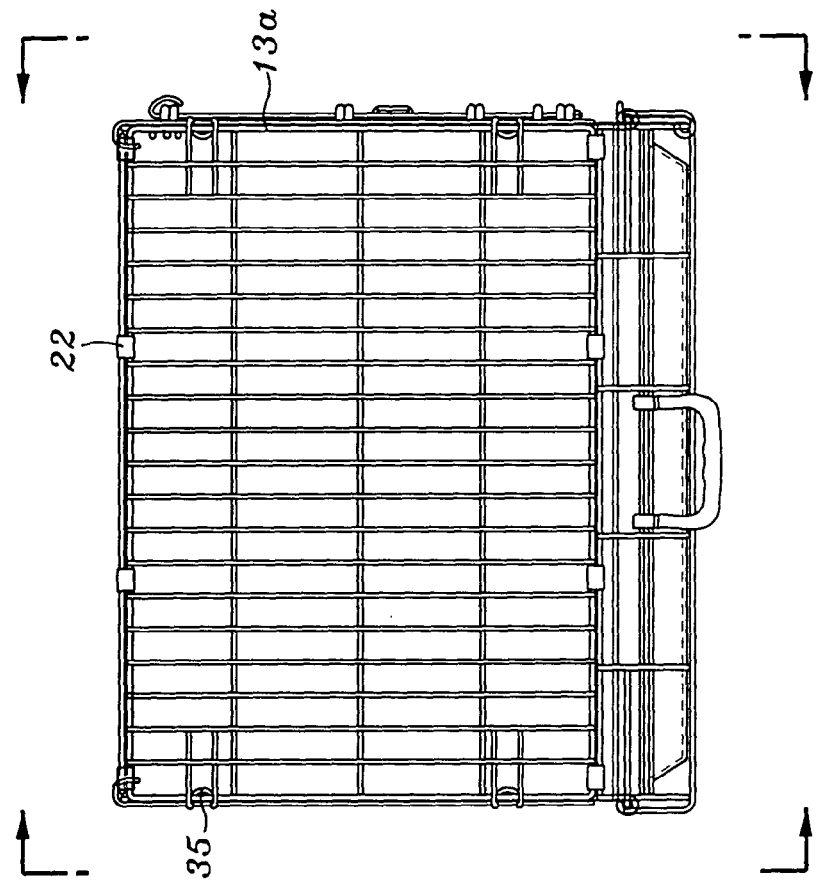
FIG. 3 shows a second side of the enclosure as illustrated in FIG. 1.

FIG. 1 is a perspective view showing the animal enclosure in one embodiment of the present invention. The animal enclosure 10 is substantially rectangular parallelepiped. The animal enclosure 10 comprises two pairs of opposite and symmetric side wall panels 13a, 13b and 15a and 15b, a top wall panel 17 and a bottom rack 19. The side wall panels 13a, 13b,15a and 15b, the top wall panel 17 and the bottom rack 19 preferably rectangular. As shown, the animal enclosure 10 further comprises a replaceable pan or a tray 11 disposed on the bottom rack 19, and doors 32 and 52 formed on the side wall panels 13a and 15a, respectively, via which the animal can be retained in or removed from the enclosures 10. Materials, toys, accessories or even food may be placed on the tray 11 for the animal to rest, play, drink and eat. Preferably, the tray 11 is made of leak-proof material that can be easily cleaned. Further, the tray 11 is sized and configured to be easily removed from and retained in the enclosure 10. In this embodiment, the tray 11 is substantially rectangular with a bottom surface slightly smaller than that of the bottom rack 19.

Referring to FIG. 1, the side wall panels 13a, 13b, 15a and 15b, the top wall panel 17 and the bottom rack 19 each have a welded wire construction to provide adequate air ventilation. However, it is contemplated that the same can be fabricated from a composite and/or polymer material.

Figure 2:
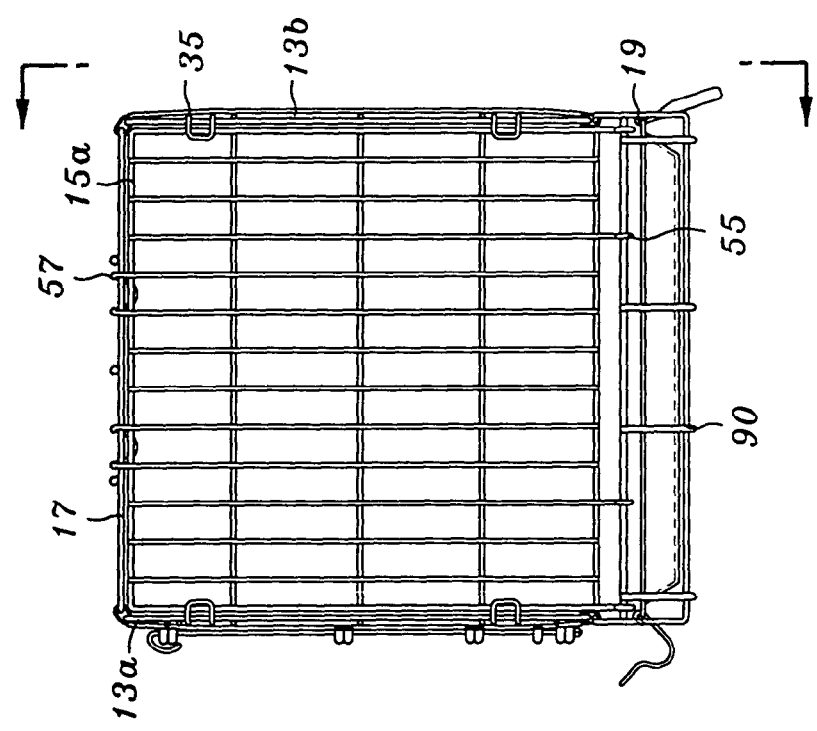
FIG. 2 shows a first side of the enclosure as illustrated in FIG. 1.

Referring to FIGS. 1–3 and 7, the bottom rack 19 comprises a bottom wall panel 92 and four side portions 90 extending upwardly from each side of the bottom wall panel 92. As shown in FIGS. 1 and 2, the side wall panel 13a includes a pair of hooks 55 extending from a bottom edge thereof and a pair of lugs 57 extending from a top edge thereof. Therefore, the side wall panel 13a is hinged to the corresponding side portion 90 of the bottom rack 19 by the hooks 55, and secured to the top wall panel 17 by the lugs 57.

Referring to FIGS. 1 and 3, the top edge and the bottom edge of the side wall panel 13a are hinged to the top wall panel 17 and the corresponding side portion 90 of the bottom rack 19 by connectors 22, respectively. The connectors 22 include binder rings, for example. The hinging connection allows a relative movement between the side wall panel 13a, the top wall panel 17, and the bottom rack 19, which will be further discussed in the following paragraph. The side wall panel 13a further comprises a pair of curved wires 35 extending from each side edge thereof. Preferably, the curved wires 35 extend perpendicular from the sidewall panel 13a towards the adjacent side wall panels 15a and 15b.

FIG. 4 illustrates the details of the side wall panel 15b. Referring to FIGS. 1 and 4, the side wall panel 15b, similar to the side wall panel 15a, is pivotally connected to the corresponding side portion 90 of the bottom rack by a pair of hooks 55 extending from a bottom edge thereof. The side wall panel 15b comprises a pair of lugs 57 extending from a top edge thereof, allowing the side wall panel 15b to secured to the top wall panel 17 in an upright position. In this embodiment, the side wall panel 15b further comprises a door 32 providing an access for retaining and removing the animal in and from the enclosure 10. As shown, the door 32 includes a latch 58 for latching the animal in the enclosure 10. A detailed description of the door will be introduced later in this specification.

FIG. 5 illustrates the details of the side wall panel 13b. Similarly to the side wall panel 13a, the top edge and the bottom edge of the side wall panel 13b are connected to the top wall panel 17 and the bottom rack 19 by the connectors 22. Preferably, the connectors 22 include binder rings that provide a hinging connection between the side wall panel 13b and the top wall panel 17, the bottom rack. Therefore, a movement of the side wall panel 13b relative to the top wall panel 17 and the bottom rack 19 can be made. The side wall panel 13b further comprises a door 32 allowing the animal to be retained in and removed from the enclosure 10 therethrough.

FIG. 6 shows an exploded view of the door 52 formed on the side wall panel 15b. As shown, the door 52 comprises a welded wire construction with one vertical side to be hinged with the side wall panel 15b, and the other vertical side swinging to close and open the enclosure 10. In this embodiment, the side wall panel 15b provides a plurality of loops 65, and the vertical side to be hinged with the side wall panel 15b defines a plurality of loops 63 to be aligned with the loops 65. An elongate wire 66 is then inserted through the loops 63 and 65, such that one vertical side of the door 52 is hinged with the side wall panel 15b. Preferably, the top end of the wire 66a is curved to engage with the top loops 63 and 65. Thus constructed, the door 52 can be removed or detached from the enclosure without using removing tool or device, allowing user to use the enclosure as a training space for animal in addition to its primary application. The door 52 has a latch 58 for locking or unlocking the enclosure 10. In this embodiment as shown in FIG. 6, the latch 58 is slidable to lock or unlock the enclosure 10.

As mentioned above, the side wall panel 13b also comprises a door 32. The corresponding members and structures of the door 32 are similar to those of the door 52, so that an additional introduction is omitted.

Figure 9:
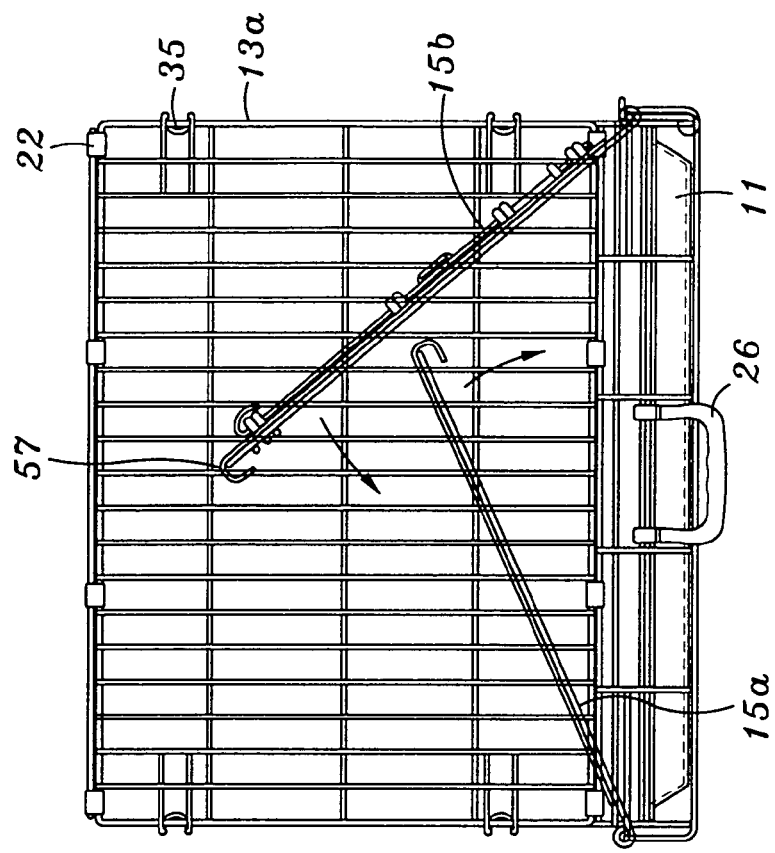
Figure 8:
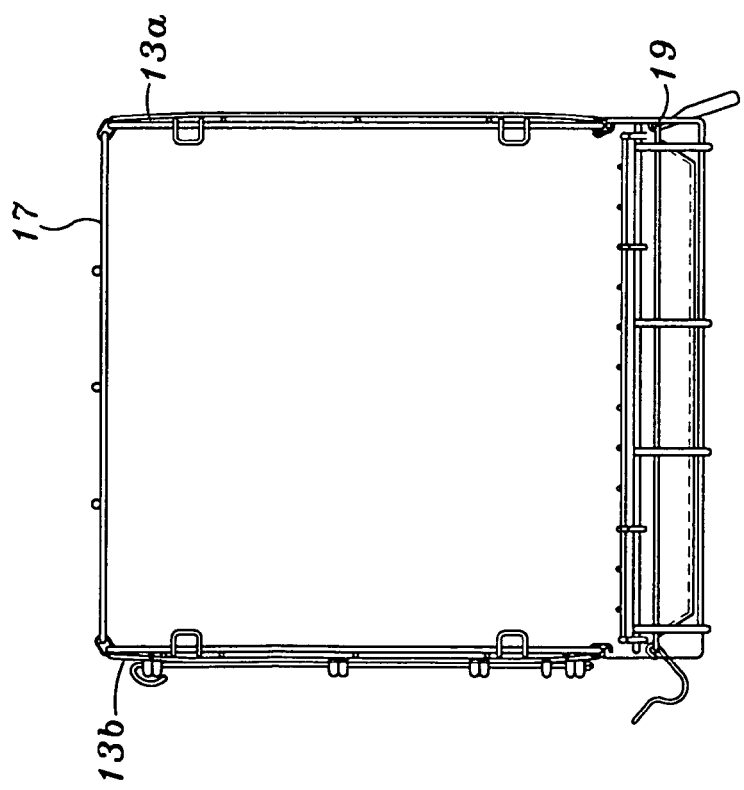

FIGS. 8 to 10 show the process of folding the enclosure 10 into a flat piece. As shown in FIG. 8, the curved wires 35a prevent the side wall panels 15a and 15b from being folded outwardly. Therefore, when the lugs 57 are released from the top wall panel 17, the side wall panels 15a and 15b are folded inwardly on the bottom rack 19. In the embodiment as shown in FIG. 9, the side wall panels 15a is to be folded underneath the side wall panel 15b. Therefore, the side wall panel 15a is hinged to the bottom rack 19 at an elevation higher than the elevation at which the side wall panel 15b is hinged to the bottom rack 19. As the side wall panels 13a and 15a are hinged between the top wall panel 17 and the bottom rack 19, by pressing the joint of the side wall panel 13b and the top wall panel 17, the side wall panel 13b is placed on the folded side wall panel 15b, and the top wall panel 17 is stacked over the side wall panel 13a external to the bottom rack 19 as shown in FIG. 11. Alternatively, one can press the joint of the side wall panel 13a and the top wall panel 17 to place the side wall panel 13a on the side wall panel 15b, so as to overlap the top wall panel 17 on the side wall panel 13b external to the bottom rack 19. In FIG. 12, the stack of the top wall panel 17 and the side wall panel 13a are folded to overlay towards the bottom rack 19, the enclosure 10 is then collapsed into a stack of the side wall panel 13b, the top wall panel 17, the side wall panels 13a, 15b, 15a, and the bottom rack 19 as shown in FIG. 13. In this embodiment, as both the side wall panels 13a and 13b are to be folded on the side wall panel 15b, both side wall panels 13a and 13b are hinged to the bottom rack 19 at an elevation higher than the elevation at which the side wall panel 15b is hinged to the bottom rack 19.

To prevent the folded panels from popping up, a latch 24 is preferably formed on one vertical side portion 90 of the bottom rack 19. When the side wall panels 13a, 13b, 15a, 15b and top wall panel 17 are folded flat on the bottom rack 19, the folded condition can be secured. At one vertical side portion 90 of the bottom rack 19, a handle 22 is preferably formed allowing the user to easily carry and transport the enclosure 10.

Indeed, each of the features and embodiments described herein can be used by itself, or in combination with one or more of other features and embodiment. Thus, the invention is not limited by the illustrated embodiment but is to be defined by the following claims when read in the broadest reasonable manner to preserve the validity of the claims.

What is claimed is:

1. An animal enclosure, comprising:
   a top wall panel;
   a bottom rack disposed opposite to the top wall panel;
   two opposite first side wall panels, each having a top edge hinged to the top wall panel and a bottom edge hinged with the bottom rack at a first elevation;
   a second side wall panel disposed between and adjacent to the first side wall panels, the second side wall panel having a bottom edge hinged to the bottom rack at a second elevation; and
   a third side wall panel opposite to the second side wall panel and adjacent to the first side wall panels, the third side wall panel having a bottom edge hinged to the bottom rack at a third elevation;
   wherein the first, second and third elevations are different from each other such that the top wall panel, the first, second and third side wall panels can be folded and upon each other on the bottom rack; and
   at least one of the first side wall panels, the second side wall panel and the third side wall panels has a removable door formed thereon wherein the first elevation is higher than the second elevation, and the second elevation is higher than the third elevation.

2. The enclosure according to claim 1, wherein the first side wall panels are hinged to the top wall panel and the bottom rack by a plurality of binder rings.

3. The enclosure according to claim 1, wherein the second and third side wall panels each comprises at least one hook extending through the bottom edges thereof to hinge the second and third side wall panels to the bottom rack.

4. The enclosure according to claim 1, wherein the second and third side wall panels each comprises at least one lug extending over the top edges thereof to secure the second and third side wall panels to the top wall panel.

5. The enclosure according to claim 1, wherein the first side wall panels further comprise at least one curved wire extending from each side edge thereof to prevent the second and third side wall panels from being folded outwardly.

6. The enclosure according to claim 1, wherein the bottom rack further comprises a latch for latching the top wall panel, the first, second and third side wall panels with the bottom rack.

7. The enclosure according to claim 1, further comprising a handle formed on the bottom rack.

8. The enclosure according to claim 7, wherein the top wall panel, the first, second and third side wall panels and the bottom rack include welded wire structures.

9. The enclosure according to claim 8, further comprising a replaceable tray disposed on the bottom wall panel.

10. The enclosure according to claim 9, wherein the side portion through which the replaceable tray is slidable includes a latch for securing the tray in the bottom rack.

11. The enclosure according to claim 7, wherein the bottom rack includes a bottom wall panel and four side portions extending upwardly from the bottom wall panel.

12. The enclosure according to claim 11, wherein the replaceable tray is slidable through one of the side portions.

13. The enclosure according to claim 1, wherein the door comprises a latch to lock or unlock the enclosure.

14. The enclosure according to claim 1, wherein two of the first, second and third side wall panels include the removable doors.

15. The enclosure according to claim 1, wherein the first side wall panels further comprise at least one curved wire extending from each side edge thereof.

* * * * *